Sept. 1, 1959 A. GUDMUNDSEN 2,902,068
SAW CHAIN HAVING REAR-BACK CONTROL
Filed Aug. 20, 1956 2 Sheets-Sheet 1
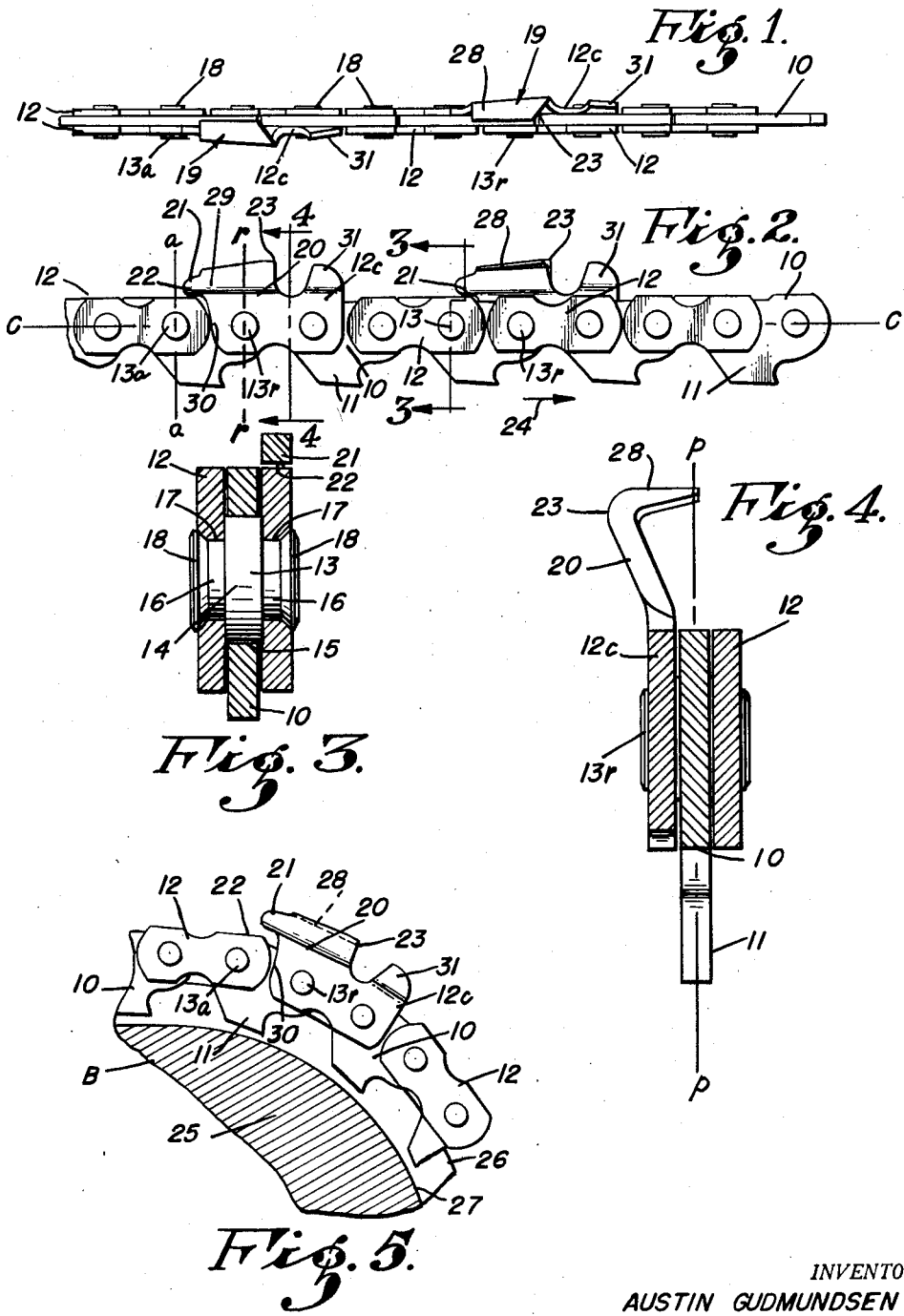
INVENTOR.
AUSTIN GUDMUNDSEN
BY
Attorney Sept. 1, 1959     A. GUDMUNDSEN     2,902,068
SAW CHAIN HAVING REAR-BACK CONTROL
Filed Aug. 20, 1956     2 Sheets-Sheet 2
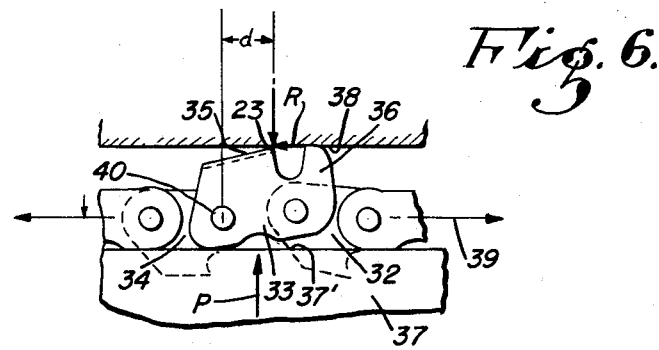
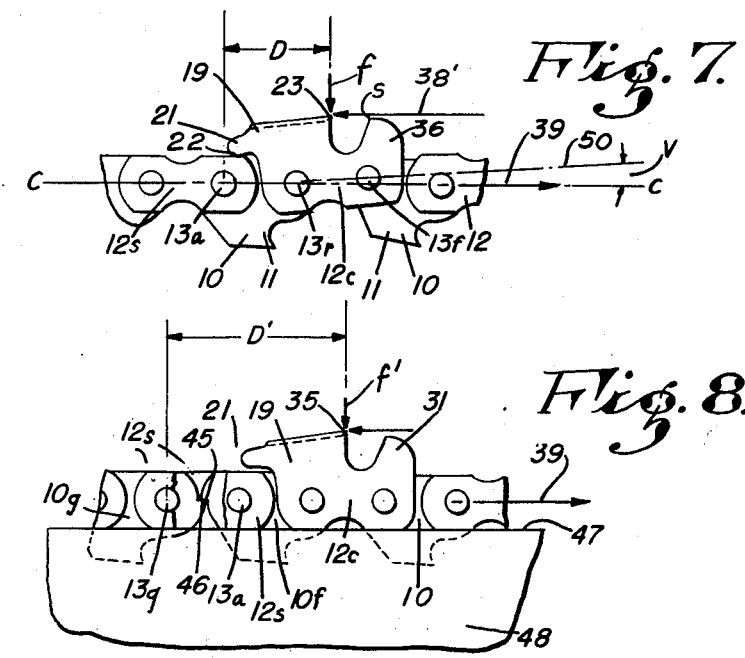
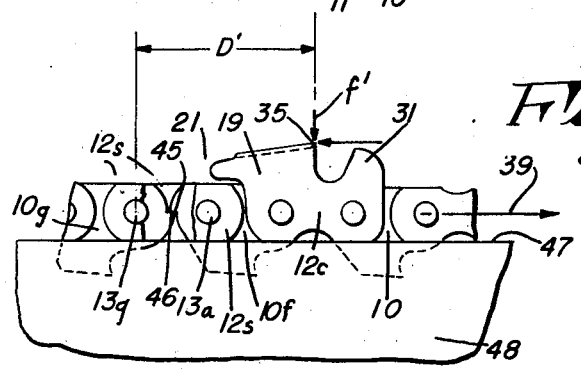
INVENTOR.
AUSTIN GUDMUNDSEN
BY
Attorney

United States Patent Office 2,902,068
Patented Sept. 1, 1959

2,902,068

SAW CHAIN HAVING REAR-BACK CONTROL

Austin Gudmundsen, Inglewood, Calif., assignor to McCulloch Motors Corporation, Los Angeles, Calif., a corporation of Wisconsin Application August 20, 1956, Serial No. 604,900

2 Claims. (Cl. 143—135)

This invention relates to saw chains wherein saw teeth or cutters are provided on links of the chain which are adapted to be power driven along an edge of a blade or plate, and relates in particular to links and cutters for saw chains.

It is an object of the invention to provide for use in a saw chain cutter teeth which are not only efficient in straight-way cutting action, but bore efficiently because of the arrangement of the cutting edge with relation to the pintles which connect the chain links.

A further object of the invention is to provide saw chain links having cutters of maximum strength and being capable of extended usage because of the cutting blades being extended rearwardly approximately to or over the front ends of the links which immediately follow the links carrying the cutters.

A further object of the invention is to provide a saw chain which requires less pressure to effect a fast feeding of the saw into the wood by reason of its having efficient means for preventing excessive, but controlled buckling action of the chain or "rear-back" of the cutters and therefore providing a chain which also has a smooth cutting action.

A further object of the invention is to provide a chain wherein the means for controlling buckling or "rear back" is arranged so that it does not add to the tensile strain normally occurring in chain as the result of the application of force necessary to pull it along the guide bar, and therefore does not add to the wear on the pintles caused by the normal tension in the chain during its operation. In the invention the forces and reactions used in the chain in preventing buckling of the cutter-carrying links are directed transversely of the longitudinal, tensile force existing in the chain during its operation.

It is an object of the invention to provide a saw chain wherein adjacent links have cooperating shoulders arranged so that the leading link of the adjacent links will be restrained from swinging outwardly with relation to the following link beyond a predetermined angular distance, these shoulders being arranged so as to act downwardly against the upper substantially horizontal edges of the succeeding links of the chain so that the forces incurred will act transversely of the longitudinal center line of the chain and therefore will not appreciably increase the forces applied longitudinally to the pintles by which the links are connected, and so that wear between the pintles and the links, resulting from the pulling of the chain along the saw bar, and the play thereby produced in the articulations of the chain will only to a very small extent affect the action of the shoulders in controlling the outward swinging of the cutter links.

Further objects and advantages of the invention may be brought out in the following part of the specification wherein a number of small details have been described for the purpose of competence of disclosure, without intending, however, to limit the scope of the invention which is defined by the accompanying claims.

Referring to the accompanying drawings which are for illustrative purposes only:

Fig. 1 is a plan view of the new chain;

Fig. 2 is a side elevational view corresponding to Fig. 1;

Fig. 3 is an enlarged fragmentary sectional view taken as indicated by the line 3—3 of Fig. 2;

Fig. 4 is an enlarged fragmentary sectional view taken as indicated by the line 4—4 of Fig. 2;

Fig. 5 is a fragmentary elevational view showing the position of a cutter link relative to other links of a chain as it travels along a curved end portion of a supporting blade;

Fig. 6 is a schematic view illustrating the rebuckling action which occurs in an ordinary saw chain;

Fig. 7 is a fragmentary sectional view demonstrating the smaller lateral pressure required against the chain disclosed in Figs. 1 to 5 to resist link buckling and thereby maintain the cutters in cutting position; and Fig. 8 is a fragmentary elevational view showing an alternative and additional means for preventing buckling of the chain, embodying the invention.

The chain of the present invention comprises center links 10 having sprocket drive lugs 11 projecting therefrom, and side links 12 which are articulated with the center links 10 by pintles 13. As shown in Fig. 3, each pintle 13 has a cylindrical body 14 of length slightly greater than the width of the articulated center link 10 which has an opening 15 to turnably receive the cylindrical body 14. The cylindrical body 14 has short, axially aligned stems 16 projecting therefrom, which stems 16 are fixed in openings 17 in the side plates 12. These stems or rivets 13 are first squeezed axially to cause them to expand radially and tightly engage the walls of the opening 17, after which the heads 18 are formed on the ends of the stems 16, thereby tightly clamping the side links against the radial faces of the cylindrical body 14. The rivets or pintles 13 are fixed with relation to the side links 12 and the cylindrical bodies 14 thereof turn within the openings 15 in the end portions of the center links 10.

Selected links 12 have cutters 19 thereon. These links are arranged along the chain in allochiral relation and are referred to as links 12c. The cutters 19, like the links 12c are in consecutive allochiral relation and each, as shown in Fig. 4, has a portion 20 which extends outwardly from a link 12c and has a tail portion 21 which projects over the top edge 22 of the next succeeding side link 12. The tail or lever portion 21 is of such length that its extremity lies above a portion of the upper edge 22 of the succeeding link 12, which edge 22 is approximately or actually parallel to the longitudinal center line c—c of the pintles 13—13, close to the transverse line a—a which intersects the center of the pintle specifically designated by the numeral 13a.

When the chain is straight, as shown in Fig. 2, rather than curved as shown in Fig. 5, the tail portion 21 is contiguous to the top edge 22 of the succeeding side link 12 so that if a force is applied to the cutter link 12c tending to rotate the same in counterclockwise direction (outwardly and rearwardly) around its rear pintle 13, indicated specifically as rear pintle 13r, the tail portion 21 will be caused to bear against the edge 22 intermediate its length, thereby limiting such rotation or rear back.

When a rearwardly acting rotative force is applied to a cutter, the pressure of the tail portion 21 against the succeeding link 12 is inwardly toward the adjacent pintle 13, identified as the pintle 13a, or transversely of the longitudinal axis a—a of the chain. This lateral pressure of the tail portion 13 does not produce in the chain a force which adds to the tension therein resulting from the pulling of the chain forwardly, in the direction of the arrow 24, during the cutting action of the saw chain.

In Fig. 5, the end portion 25 of the cutter bar B is shown with a portion of the new chain thereon. The end portion 25 has a curved edge 26 with a groove 27 therein to receive the drive lugs 11 of the chain. As the chain moves around the curved edge 26 of the bar B the adjacent links 10 and 12 swing into angular relation to each other, with the result that the tail portions 21 of the cutters 19 swing outwardly away from the edges 22 of the succeeding links 12.

As shown in Fig. 4, the web or side portion 20 of each cutter 19 diverges outwardly from the central plane p—p of the chain and has a transverse plate portion 28 extending from the outer edge thereof to or through the central plane p—p. The front ends of the portions 20 and 28 of the cutter 19 are sharpened so as to form the forwardly presented cutting edge 23 thereon. Referring to Fig. 2, it will be perceived that the transverse line 4—4 is intermediate the pintles 13 and 13r on the intersected cutter link 12c, and that the cutting edge 23 is contiguous to the intermediate transverse plane indicated by the line 4—4. In the form of the invention shown, the cutting edge 23 lies rearwardly of the transverse intermediate plane 4—4, and as the front end of the cutter 19 is sharpened by filing or grinding, the cutting edge 23 will be gradually shifted rearwardly, (leftwardly) toward and beyond the transverse lateral line r—r which intersects the rivet 13r. The chain is provided with depth gauges 31 for the respective cutters 19. These are formed on the forward ends of the cutter links 12c, and they are adapted to be shortened by filing as the cutters 19, which have the customary side and top clearances, are reduced in length and height as the result of being sharpened.

In Fig. 6, I show links 32, 33 and 34 of an ordinary saw chain, the link 33 having thereon a cutter 35 preceded by a depth gauge 36. The links 32—34 are shown on a portion of a saw bar 37 and the cutter 35 is shown in cutting engagement with the bottom wall 38 of a kerf being cut. When the chain is pulled forwardly, as indicated by the arrow 39, the cutter 35 will tend to cut a shaving from the bottom wall 38 of the kerf being cut. The resistance of the wood to the cutting action will result in a reaction indicated by the arrow R against the cutting edge 23 of the cutter 35, tending to rotate the cutter 35 and the link 33 which supports it in counterclockwise direction around the pintle 40 which connects the links 33 and 34. Owing to the fact that the depth gauge 36 is a greater distance from the center of the pintle 40 than the cutting edge of the cutter 35, the depth gauge 36 will move outwardly at a greater rate than the outward movement of the cutting edge as counterclockwise rotation of the link 33 around the center of the pintle 40 occurs, reducing the depth of cut to zero value. In order to offset this reduction of the depth of cut as a result of the rear-back or counterclockwise rotation of the link 33, a force must be applied acting to prevent the rotation of the link 33 referred to in the foregoing. Ordinarily, the operator will apply a force or pressure through the saw bar 37 as indicated by the arrow P tending to force the cutter 35 against the kerf bottom 38. This will result in a reacting force against the cutter as indicated by the arrow F, at a distance $d$ from a transverse line which passes through the center of the pintle 40, this reaction or force F acting against the cutting edge of the cutter 35 tending to move the same toward the saw bar 37, to hold the rightward end of the link 33 closer to the edge 37' of the bar 37, so that the outer face of the depth gauge 36 will be spaced inwardly from the longitudinal plane of the cutting edge, so that a chip or shaving of practical thickness may be cut.

In Fig. 7, I show a cutter link 12c and the links 10 which precede and follow it in the chain disclosed in Figs. 1 and 2. When it is pulled along the bar B by the force indicated by the arrow 39 with the cutting edge 23 in engagement with the bottom wall 38 of the kerf being cut, the reaction R tends to rotate the link 12c in counterclockwise direction. The tail portion 21 of the cutter 19 on the link 12c engages the top of the succeeding side link 12s, prevents further rotation of the link 12c in counterclockwise direction around the pintle 13r, but the link 12c may only swing in counterclockwise direction around the pintle 13a at the relatively greater distance D from the cutting edge 23. Therefore, as compared to the reaction R, the force required to hold the link 12c against the edge 37' of the bar B is of a value indicated approximately by the length of the arrow $f$. This force is reduced as compared to the reaction R, and when the saw is employed to cut the comparatively softer woods, such as pulpwood, merely the weight of the saw will be sufficient, when the cutters are sharp, to give a good feeding action of the saw chain into the wood being cut.

I have found that a controlled rear-back of the cutters from 3½° to 7° results in an important improvement in the cutting action of the chain, especially where it is employed in conjunction with a power driven saw having a positive feeding or pressure applying means such as a spike which is brought into engagement with wood to be cut and around which spike the saw blade is caused to rotate. This amount of rear-back is not sufficient to offset the depth gauge setting, as occurs in chains made in the manner disclosed in Fig. 6. What is meant by the foregoing is that when the cutter link 12c, such as shown in Fig. 7, is rotated in counterclockwise direction so that the tail 21 thereof engages the upper edge 22 of the succeeding link 12s, there will still be a space $s$ between the extremity of the depth gauge 36 and the line 38' which is at the level of the cutting edge 23. I have found that for most woods an average of 4½° of rear-back is suitable for a 9/16 inch pitch chain. The measure of the rear-back angle is the angle $v$ of the line 50, Fig. 7, with the chain center line C—C. The line 50 intersects the centers of the front and rear pintles 13s and 13r which connect the cutter link 12c with the adjacent center links 10. The angle $v$ is the measure of the counterclockwise or rear-back rotation of the cutter link 12d around is rear pivot consisting of the pintle 13r.

In the chain shown in Fig. 8, a cutter link 12 is connected between center links 10 and 10f, the link 10f being connected by side links 12s to a succeeding center link 10g. The cutter 12c of Fig. 8 has a tail portion 21 which lies over the forward portion of the succeeding side link 12s. The links 10f and 10g have shoulders 45 and 46 in abutting relation when the chain is against the edge 47 of a saw bar 48. The shoulders are parallel to the longitudinal center line of the chain defined by the center of the chain pintles. The shoulder 45 lies above and the shoulder 46 below, so that the engagement of these two shoulders will prevent rotation of the link 10f in counterclockwise direction around the pintle 13a. The action R of Fig. 8 will tend to rotate the cutting edge 35 in clockwise direction around the pintle 13g lying at a distance D' from the cutting edge, and a relatively small reacting force $f'$ will be sufficient to hold the chain against the edge 47 of the saw bar 48, and with the cutter link 12 in this position the depth gauge 31 will be positioned with relation to the cutting edge 35, enabling the cutting edge 35 to cut a chip of predetermined thickness, resulting in a fast cutting action and consequent ease of feeding the saw into the wood.

I claim:

1. In a saw chain: a series of center links each having a lug projecting inwardly from one edge thereof to guidingly engage with the cutter bar of the saw, a series of side links connected by pintles on opposite sides of said center links to pivotally interconnect the adjoining ends of adjacent center links, selected side links spaced longitudinally along said chain having cutters integrally formed thereon, each of said cutters having a side portion diverging outwardly from the longitudinal center plane of the chain with a plate portion extending transversely from the outer edge of said side portion toward said center plane, said side portion and said plate portion having the forward ends thereof sharpened to form a forwardly presented cutting edge on the cutter of each of said selected side links, said cutters on said selected side links being in allochiral relation along opposite sides of said series of center links, each of said selected links having a depth gauge spaced forwardly of the cutting edge on the cutter and extending outwardly from the edge of the link for a length less than the outward extension of the sharpened end of the plate portion of the cutter, each side link following one of said selected side links having a straight outer edge portion extending parallel to the longitudinal center line of the chain, a tail portion extending rearwardly from the rearward end of said cutter and at least partially overlying said straight outer edge portion on the following side link to engage said straight outer edge portion intermediate its length at a point in proximity to a line extending transversely through the forward pintle of the following side link, said tail portion on the cutter of each of said selected side links being spaced from said straight edge portion of the following link in the straight line relation of the chain links to enable a limited rear-back of the cutter carrying selected links.

2. In a saw chain as recited in claim 1 wherein the space between said tail portion and said straight edge portion provides rear-back of the cutter carrying link in the range which approximates an angle of 3½ to 7 degrees.

References Cited in the file of this patent

UNITED STATES PATENTS

| | | |
|---|---|---|
| 2,351,112 | Day | June 13, 1944 |
| 2,356,437 | Smith | Aug. 22, 1944 |
| 2,485,962 | Entwisle | Oct. 25, 1949 |
| 2,608,222 | Jensen et al. | Aug. 26, 1952 |
| 2,622,636 | Cox | Dec. 23, 1952 |
| 2,695,042 | Conley | Nov. 23, 1954 |
| 2,725,083 | Ackley | Nov. 29, 1955 |

FOREIGN PATENTS

| | | |
|---|---|---|
| 27,283 | Sweden | Mar. 15, 1955 |